Patented Aug. 19, 1952

2,607,693

UNITED STATES PATENT OFFICE 2,607,693

ICING COMPOSITION AND PROCESS OF MAKING

Haverman P. Latham, Cresskill, N. J., and William E. Barch, New York, Harold K. Steele, Dobbs Ferry, and Leonard Zuckerman, Bronx, N. Y., assignors to Standard Brands Incorporated, New York, N. Y., a corporation of Delaware No Drawing. Application February 7, 1951, Serial No. 209,922

12 Claims. (Cl. 99—139)

This invention relates to icing syrups and a process for preparing the same.

Ordinary bakers' boiled icings are prepared as needed by boiling a solution of cane sugar and glucose in water until the temperature has reached approximately 240° F. This boiled syrup is then added to partly beaten egg whites and the beating is continued until the icing foam has reached the desired consistency.

The preparation of boiled icing requires skill, is attended with frequent failures and is a time-consuming nuisance-type of operation. It is inconvenient because of the necessity for preparing fresh icing for each batch of cake.

The object of the present invention is to avoid all of these disadvantages and provide ready mixed icing syrup which needs only to be beaten for use. We have found that egg whites, sugar and water, if combined in certain proportions, will give a clear syrup having good flavor and beating qualities. The syrup can be whipped to give an icing which is equal to a freshly made boiled icing prepared as described above. The syrup should have a total solids content of about 65% to 70%, and preferably 68%, and should contain 20% to 40% liquid egg whites, 54% to 60% sugar and the balance water. The sugar is preferably sucrose or glucose or mixtures of these two sugars. When mixtures are used the amount of glucose in the syrup is preferably 5% to 30%. The glucose gives a lighter and more stable icing.

Icings having the above described composition have some tendency to darken and form a precipitate on standing. This can be avoided by adjusting the pH to between about 4.5 and about 7.0, and preferably about 5.5, and by incorporating a small amount, say about 0.5 to about 2.0% of a substance, for instance an edible water-soluble salt, capable of increasing the rate of surface denaturation of the egg albumen. Edible water-soluble salts having this property include, for instance, the citrates, gluconates and tartrates of sodium and potassium. These salts shorten the whipping time and stabilize the foam. It is preferable to add also an edible acid or acid salt, for instance citric, phosphoric, gluconic and tartaric acids and their acid salts.

To make up the composition the ingredients may be mixed with the water in any order and the mixture stirred until a clear syrup is obtained. This can be done at room temperature although the use of hot water will facilitate solution. The mixing is preferably carried out at a temperature of 40–60° C. in a jacketed tank.

The composition may also be prepared in the following manner. The sugar or mixture of sugars is dissolved in the water and the solution is boiled until its temperature rises to between about 235° F. and 245° F. at atmospheric pressure. If the syrup boils at a lower temperature it beats poorly and the icing foam tends to become too liquid. In the case of a syrup boiling at a higher temperature, the sugar tends to crystallize on standing and the product takes on a dark color. The sugar solution is then cooled to between about 140° F. and 160° F. The egg whites are now stirred in. At temperatures below 140° F. the solution is too viscous to handle. At temperatures above 160° F. the egg whites may coagulate.

The resulting mixture is cooled to about 80° F. and then, if desired, the salt and acid are added. After thorough mixing the foam formed on top of the syrup is skimmed off and the syrup is ready for packaging.

Alternatively, the icing syrup may be prepared by mixing enough sugar with water to give a solution whose boiling point is between 235° F. and 245° F., heating this mixture to between about 140° F. and 160° F., adding the egg whites and stirring until all the sugar has dissolved.

The invention is illustrated by the following examples:

*Example 1.*—An icing syrup was prepared from the following ingredients:

| | |
|---|---|
| Sucrose | 600 lbs. |
| Corn syrup | 90 lbs. |
| Liquid egg whites | 240 lbs. |
| Citric acid | 2 lbs., 3 oz. |
| Tri-sodium citrate | 10 lbs. |
| Water | 12 gals. |
| Approximate yield | 1,040 lbs. |

Flavoring materials may be included in the syrup when it is made, if desired, but it is preferable to add them when the syrup is to be used.

The water is heated to 70° C. and the citric acid and sodium citrate are dissolved therein. The corn syrup is dissolved in this solution, the sucrose is added and the mixture stirred until the sugar is entirely wet and free of lumps. Then the egg whites are added and mixing is continued until all of the sugar dissolves and a clear syrup is obtained. The solids content is about 68% and the pH 5.5

The syrup is permitted to stand until the foam rises to the top, the foam is skimmed off and the product is sealed in cans or glass containers.

*Example 2.*—A syrup was prepared as described in Example 1 except that the citric acid and sodium citrate were omitted. Whipped icing made from this syrup is satisfactory but markedly less stable than that prepared from the syrup of Example 1.

*Example 3.*—A solution of 60 pounds of granulated cane sugar and 9 pounds of corn syrup (43° Baumé) in 18 pounds of water is heated to boiling and boiling continued until the temperature has reached 240° F. (760 mm. pressure). The solution is cooled to 150° F. and 24 pounds of liquid egg whites are stirred in. One pound of citric acid is dissolved in one pound of water. 4½ ounces of this solution are then mixed in the syrup.

To 100 pounds of the above syrup is added a solution of 2 pounds powdered sodium citrate in two pounds of water. Then 4¼ oz. more of the citric acid solution as described above are added. The foam that forms is then skimmed off the syrup and the product is packaged.

It has been found that some batches of icing syrup caused bulging of the cans in which they were packed. Investigation showed that this is due to evolution of carbon dioxide caused by the Maillard reaction between reducing sugars and/or amino acids and proteins. This reaction also causes the syrup to turn brown. The Maillard reaction is catalysed by certain metals, for instance aluminum, iron and zinc. Therefore, it is important to avoid contamination of the icing syrup with such catalysts by avoiding the use of raw material containing them and by maintaining the syrup out of contact with catalytic metals during preparation and storage.

We claim:

1. A clear aqueous icing syrup having a solids content of about 65% to 70% and comprising about 54% to 60% sugar and about 20% to 40% liquid egg whites.

2. An icing syrup as claimed in claim 1 wherein the syrup comprises 5% to 30% glucose.

3. An icing syrup as claimed in claim 1 having a pH between about 4.5 and 7.

4. An icing syrup as claimed in claim 1 containing a small amount of a substance capable of increasing the rate of surface denaturation of egg albumen.

5. An icing syrup as claimed in claim 1 containing a small amount of an edible water-soluble salt capable of increasing the rate of surface denaturation of egg albumen.

6. An icing syrup as claimed in claim 1 containing about 0.5% to about 2% of an edible water-soluble salt capable of increasing the rate of surface denaturation of egg albumen.

7. An icing syrup as claimed in claim 1 containing about 0.5% to 2% of tri-sodium citrate.

8. An icing syrup as claimed in claim 1 which is substantially free of catalysts for the Maillard reaction.

9. A clear icing syrup composed of the following ingredients in approximately the indicated proportions:

| | |
|---|---|
| Sucrose | 600 lbs. |
| Corn syrup | 90 lbs. |
| Liquid egg whites | 240 lbs. |
| Citric acid | 2 lbs., 3 oz. |
| Tri-sodium citrate | 10 lbs. |
| Water | 12 gals. |

10. Process of preparing an icing syrup which comprises mixing sugar and warm water until the sugar is entirely wet and then adding liquid egg whites and mixing until all of the sugar has dissolved and a clear syrup is obtained, the finished product comprising about 50% to 60% sugar and about 20% to 40% liquid egg whites and having a solids content of about 65% to 70%.

11. Process of preparing an icing syrup which comprises mixing enough sugar with water to give a solution whose boiling point is between 235° F. and 245° F., heating this mixture to between 140° F. and 160° F., adding liquid egg whites to said mixture and then stirring until all the sugar has dissolved, the finished product comprising about 50% to 60% sugar and about 20% to 40% liquid egge whites and having a solids content of about 65% to 70%.

12. Process of preparing an icing syrup which comprises boiling a solution of sugar in water until its temperature is between about 230° F. and 245° F., cooling said solution to between about 140° F. and 160° F. and then stirring liquid egg whites therein, the finished product comprising about 54% to 60% sugar and about 20% to 40% liquid egg whites and having a solids content of about 65% to 70%.

HAVERMAN P. LATHAM.
WILLIAM E. BARCH.
HAROLD K. STEELE.
LEONARD ZUCKERMAN.

REFERENCES CITED

The following references are of record in the file of this patent:

UNITED STATES PATENTS

| Number | Name | Date |
|---|---|---|
| 990,168 | Scott | Apr. 18, 1911 |
| 1,643,951 | Leo | Oct. 4, 1927 |
| 2,019,123 | Erickson | Oct. 29, 1935 |

OTHER REFERENCES

"Everybody's Cookbook" by Lord, Revised Edition, Harcourt, Brace and Company, New York, pages 431–433.